US012673242B2

(12) United States Patent
Westgate

(10) Patent No.: US 12,673,242 B2
(45) Date of Patent: Jul. 7, 2026

(54) MULTI-AXIS HOLDING DEVICE FOR GOLF BALL ORIENTING AND PRINTING

(71) Applicant: Acushnet Company, Fairhaven, MA (US)

(72) Inventor: Richard Westgate, Rochester, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/826,264

(22) Filed: Sep. 6, 2024

(65) Prior Publication Data

US 2024/0424354 A1 Dec. 26, 2024

Related U.S. Application Data

(62) Division of application No. 18/072,756, filed on Dec. 1, 2022, now Pat. No. 12,083,393.

(51) Int. Cl.
*B41F 17/30* (2006.01)
*A63B 45/02* (2006.01)
*A63B 37/00* (2006.01)

(52) U.S. Cl.
CPC .............. *A63B 45/02* (2013.01); *B41F 17/30* (2013.01); *A63B 37/0022* (2013.01)

(58) Field of Classification Search
CPC ........ B41F 17/001; B41F 17/22; B41F 17/30; B41F 17/34; B41F 17/18; B41F 17/20; B41F 17/24; B41M 1/40; A63B 45/02; A63B 37/002
USPC .......................................... 101/35, DIG. 40
See application file for complete search history.

(56) References Cited

U.S. PATENT DOCUMENTS 4,843,958 A * 7/1989 Egosi ........................ B41J 2/01 101/2
6,418,843 B1 7/2002 Givler
2002/0097280 A1 7/2002 Loper
2011/0292146 A1 12/2011 Sigismondo
2015/0085046 A1 3/2015 Moehringer

FOREIGN PATENT DOCUMENTS

JP H0531879 A 2/1993
JP H0717018 A 1/1995
KR 101091987 B1 * 12/2011 ............ A63B 45/02

OTHER PUBLICATIONS

English translation of KR 101091987 B1, publication date Dec. 9, 2011. (Year: 2011).*
English translation of JP-H0717018A (Takahashi et al.) from Google Patents, publication date Jan. 1995. (Year: 1995).
English translation of JP-H0531879A (Mizukoshi) from Google Patents, publication date Feb. 1993. (Year: 1993).

* cited by examiner

*Primary Examiner* — Leslie J Thompson
(74) *Attorney, Agent, or Firm* — Steven Landolfi, Jr.

(57) ABSTRACT

A holding device includes a support mechanism configured to contact and hold the golf ball, a first motion device configured to move the golf ball and at least a portion of the support mechanism in a translational direction along an axis, a second motion device configured to move the golf ball and at least a portion of the support mechanism in a rotational direction around the axis, and a securing mechanism configured to produce a retaining force configured to hold the golf ball to the support mechanism.

10 Claims, 9 Drawing Sheets

MULTI-AXIS HOLDING DEVICE FOR GOLF BALL ORIENTING AND PRINTING

CROSS-REFERENCE TO RELATED APPLICATIONS

This application is a divisional of U.S. patent application Ser. No. 18/072,756, filed Dec. 1, 2022, now U.S. Pat. No. 12,083,393, and which is hereby incorporated herein in its entirety.

FIELD OF THE INVENTION

The present disclosure relates generally to a handling system, and, more particularly, to a compact holding and orienting device for multi-hit printing on a golf ball.

BACKGROUND OF THE INVENTION

Golf balls often include printed markings at various locations on the surface. There are several printing methods for applying the markings, including pad printing and laser jet printing, for example. In order to print on different portions of the same golf ball, different sites on the surface of the golf ball are aligned and exposed to a printing element. Some current printing processes require an operator to manually change the position of a golf ball in order to enable multi-hit printing. In another example, a stationary golf ball may receive a stamp at different sites via multiple, spaced printing elements. These and other conventional methods can be inefficient and require large space-consuming equipment. The present disclosure includes a golf ball handling system having a compact holding and orienting device for precision printing of stamps at specific sites/locations on the surface of a golf ball.

SUMMARY OF THE INVENTION

According to an exemplary embodiment, the present disclosure describes a method for printing a combined marking on the surface of a golf ball, the method including coupling the golf ball to a holding device such that the golf ball is in a first position. The holding device includes a support mechanism, a first motion device configured to move the support mechanism, a second motion device configured to move the support mechanism, and a securing mechanism configured to produce a retaining force to retain the golf ball to the holding device. The method also includes performing a first printing operation to print a first stamp on a first site on the surface of the golf ball while the golf ball is in the first position, moving, by the holding device, the golf ball to a second position, and performing a second printing operation to print a second stamp on a second site on the surface of the golf ball while the golf ball is in the second position.

According to another embodiment, the present disclosure describes a holding device for handling a golf ball. The holding device includes a support mechanism configured to contact and hold the golf ball, a first motion device configured to move the golf ball and at least a portion of the support mechanism in a translational direction along an axis, a second motion device configured to move the golf ball and at least a portion of the support mechanism in a rotational direction around the axis, and a securing mechanism configured to produce a retaining force configured to hold the golf ball to the support mechanism.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF THE INVENTION

Figure 1:
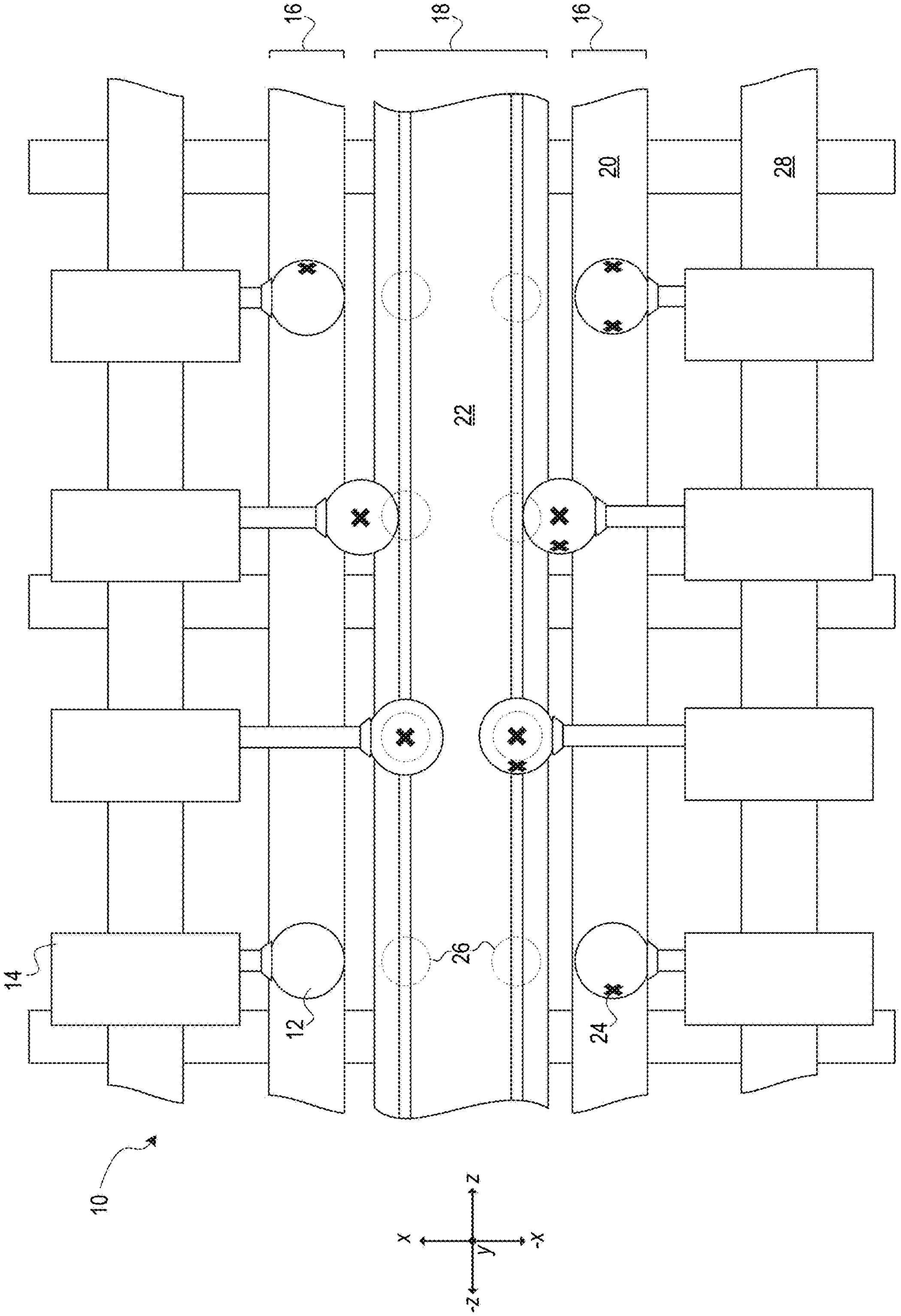
FIG. 1 illustrates a golf ball handling system, according to an exemplary embodiment.

Disclosed embodiments include systems, devices, and methods for handling and orienting an object such as a golf ball, a component of a golf ball, or a golf ball manufacturing component (e.g., a mold). An exemplary system may include one or more holding devices that have a compact size and versatile functionality for manipulating and orienting a golf ball moving through the system. Each holding device may include a component for producing a retaining force for holding the golf ball in a selected position. Each holding device may also include a plurality of motion devices (e.g., motors) for manipulating the position of the golf ball across multiple degrees of freedom.

Disclosed systems and devices enable multi-hit printing on the surface of a golf ball. An exemplary holding device includes features to enable translational and rotational positioning of a golf ball in order to expose a selected portion of a golf ball surface for printing. Some embodiments include features to enable rotation about more than one axis and/or degree of freedom. The ability to position a golf ball in relation to a printing pad aids in enabling an effective pad printing process for producing a variety of markings and marking patterns on a golf ball.

In pad printing, ink is deposited onto a plate and arranged in a pattern corresponding to the markings to be made on the golf ball. A pad contacts the plate and thereby receives the ink on the pad surface. The ink is then transferred from the pad to the golf ball by pressing the inked pad onto the golf ball to produce a stamp. A "stamp" or "marking," as used herein, refers to the printed area produced by application of an ink-carrying pad to a surface of an item, such as a golf ball. A "single stamp" or "single marking" refers a printed area produced by only one application of an ink-carrying pad onto the item. Pad printing is an indirect intaglio process. Depressions are created in a flat block called "the plate" or pad printing cliche. The depressions are filled with ink and a smooth, resilient stamp block of silicone rubber takes up ink from the plate and transfers it to the golf ball.

In some embodiments, a pad printing process begins by spreading ink across the surface of a plate using a spatula. The ink is then scraped back into the ink reservoir using a doctor blade which leaves ink in the depressions on the plate. Thinner evaporates from the ink lying in these depressions and the ink surface becomes tacky. As the pad passes over the depressions, ink will stick to the pad. As the pad lifts, it takes with it not only the tacky, adhering film, but also some of the more fluid ink underneath. This film of ink is carried to the target area on the dimpled golf ball surface. On the way, more of the thinner evaporates from the exposed, surface of the ink on the silicone pad, and the ink surface facing away from the pad becomes tacky. As the pad is applied to the golf ball, the film of ink sticks to the ball surface, and separates from the pad as it is raised.

Disclosed embodiments by use any type of ink suitable for printing on a golf ball. There are numerous types of inks available within the printing industry, such as solvent evaporating inks, oxidation curing inks, reactive (catalyst curing or dual-component) inks, baking inks, UV curable inks, sublimation inks, and ceramic and glass inks.

Solvent-based inks are predominant in the pad-printing industry, as they dry very rapidly through solvent evaporation alone. They are very versatile inks, as they are available in both gloss and matte finishes and perform very well with many thermoplastic substrates. Oxidative curing inks have limited uses in pad-printing applications due to their slow drying speed. They do, however, produce very tough, flexible, weather-resistant ink films and are very useful for printing onto metal and glass surfaces.

It is possible to use 1-component inks because their long shelf life can make them easier to work with and more economical. Some 1-component inks are highly resistant to abrasion and solvents. Curing can take place physically or by oxidation.

Dual-component inks are also used extensively in pad-printing and contain resins capable of polymerization. These inks cure very rapidly, especially when heated and are generally good for printing on substrates such as metals, some plastics, and glass, and have very good chemical and abrasion resistance. The inks, though, do have a restricted shelf life once the polymerization catalyst has been added. With 2-component inks, curing typically takes place over about a 5-day period at a temperature of about 20° C., or over about a 10-minute period at a temperature of about 100° C.

Ceramic and gas (thermo) diffusion inks are also used in the pad-printing industry. These inks are solid at room temperature and must be heated in the ink reservoir to a temperature greater than about 80° C. Unlike solvent evaporating inks, pad wetting occurs due to the cooling effect the pad has on the heated ink rather than because of the evaporation of solvent. Ink transfer occurs because the outer surface of the ink becomes tacky when exposed to air. The ink transfer is aided by the cooler surface of the substrate to be printed on.

Ultraviolet ink can also be used in the present invention. UV inks are typically cured by means of UV light having wavelengths of from about 180 nm to 380 nm. The advantages of using a UV ink are that they are fast and cure thoroughly, they are easy to use and are not affected by small changes in ambient conditions, they retain constant viscosity (i.e., they do not dry up quickly), and they use smaller amounts of combustible organic solvent, such that little or no solvent fumes escape into the working environment and are, therefore, environmentally safer. Small amounts of solvent may be added to the UV inks for certain application to enable the ink to transfer in a conventional manner.

The inks may optionally contain additives such as binders, reactive prepolymers, thinners, low-viscosity mono and poly-functional monomers, photoinitiators to stimulate polymerization, stabilizing additives, flow control agents, wetting agents, pigments, extenders, or combinations thereof.

The film of ink is transferred to the predetermined three-dimensional surface. In a preferred embodiment, the surface is the dimpled surface of a golf ball. In an alternative embodiment, other three-dimensional surfaces, such as golf clubs and golf shoes, are possible. The color logo or image may be printed over or under a clearcoat. Preferably, the color indicia is printed under the clearcoat. After the printing process is complete, the three-dimensional objects may be removed to a dry room to finally cure the ink used for the logo. The dry room is maintained at an elevated temperature to aid in drying the logo ink.

The thickness of the ink film transferred to a golf ball can be any thickness that is sufficient to provide a clear image of the logo and can vary with the ink type and color. The thickness of the ink film is also influenced by the viscosity of the ink, the pad material, the depth of etching in the plate, and environmental factors, such as temperature, humidity, and so on. This thickness can be between about 5 μm and 75 μm, but is not limited thereto.

While many stamp designs can be printed with a single pad hit onto the golf ball, there are some designs that cover a larger surface area of the golf ball and cannot be produced as one stamp. For example, a stamp design that extends more than approximately 60° around a great circle of a golf ball likely requires more than one pad hit to produce the entire marking. For example, a first stamp may cover 30-90° while a second stamp may cover an additional 30-90° in the same circumferential direction along a great circle of the golf ball to produce a stamp covering 60-180° of the great circle. In other embodiments, more than two stamps covering at least 30° each may be used to produce a linear marking extending up to 360° around a perimeter (e.g., a great circle or other continuous line) of the golf ball. The disclosed embodiments provide a handling system and holding device for positioning and orienting a golf ball for printing of single or combined multi-hit stamps.

FIG. 1 is an illustration of a golf ball handling system 10, according to an exemplary embodiment. The golf ball handling system 10 is configured to handle and manipulate at least one golf ball 12 during a manufacturing or product finishing process. The golf ball handling system 10 comprises a plurality of holding devices 14 configured to orient one or more of the golf balls 12. The embodiment of the golf ball handling system 10 depicted in FIG. 1 is an exemplary multi-holder system including a plurality of holding devices 14. Other embodiments of a golf ball handling system may include a single holding device 14.

In the disclosed figures, the reference numerals are included and point to examples of corresponding components, even though more are shown. The description of one feature that is repeated can be equally applied to the same features throughout the embodiment. For example, in the depicted embodiment, all of depicted holding devices are the same or similar and thus are represented by the labeled holding device 14. Similarly, the golf balls are the same or similar and thus are represented by the golf ball 12. In an exemplary implementation of the depicted embodiment, a group of golf balls 12 (which may be the same type or include different constructions) may be supplied to the golf ball handling system 10 such that each of the plurality of holding devices 14 acquires and secures a different golf ball 12 for further processing and/or manufacturing. In other embodiments, the golf balls 12 may be golf ball components or related parts, such as a golf ball core, golf ball mold, or similar.

Generally, the golf ball handling system 10 is configured to hold and move a golf ball 12 to selectively impart (1) translational motion in at least one direction and (2) rotational motion about at least one axis. In the embodiment of FIG. 1, the holding devices 14 are configured to move a respective golf ball 12 in a translational direction between a first zone 16 and a second zone 18. In FIG. 1, the translational direction in which the first zone 16 is spaced from second zone 18 is marked as the x-axis direction. The holding devices 14 are further configured to rotate a respective golf ball 12 at least about an axis that is parallel to the translational direction (which in this embodiment is the x-axis direction).

In FIG. 1, the first zone 16 and the second zone 18 have a length in the z-direction, which is perpendicular to the x-axis direction. The first zone 16 may coincide with a conveyor 20 configured to move at least one of the golf balls 12 in the z-direction. For instance, the conveyor 20 may move a golf ball 12 to a position along the z-direction that corresponds to a contact point for a holding device 14, thereby enabling the holding device 14 to grab and hold the golf ball 12 and impart translational and/or rotational motion. For example, the holding device 14 may be configured to attach to a golf ball 12 at a contact point and move the golf ball 12 to the second zone 18 and/or rotate the golf ball to a desired orientation.

The second zone 18 may be a location for a further processing and/or manufacturing step for the golf ball 12. In one example, the second zone 18 may be a printing area 22 for printing a marking 24 onto the golf ball 12. The printing area 22 may include a plurality of printing pads 26 aligned with the second zone 18 such that when a holding device 14 moves a golf ball 12 into the printing area 22, a respective printing pad 26 may move into contact with the golf ball 12 to apply a marking 24. In one embodiment, the holding device may hold the golf ball 12 to enable a single printing pad 26 to stamp the golf ball 12 in one location from a single direction (e.g., the y-axis direction as marked in FIG. 1). In other embodiments, the holding device 14 may hold the golf ball for multi-hit printing from multiple directions.

In an embodiment of the golf ball handling system 10, multiple holding devices 14 are positioned next to each other in the z-direction to enable simultaneous handling of multiple golf balls 12. The holding devices 14 may be attached to a mount 28. In some embodiments, the mount 28 may be a stationary support block. In other embodiments, the mount 28 may be a conveyor or similar device configured to move the supported holding devices 14 in a translational direction, such as the z-direction as marked in FIG. 1. In FIG. 1, golf ball handling system 10 has a mirrored arrangement with separate groups of holding devices 14 facing each other and attached to separate mounts 28. In this way, the printing area 22 can be utilized from two sides. A dual line configuration of printing pads 26 is shown, but a single line of printing pads could also be utilized to stamp golf balls 12 approaching from two different directions (e.g., in an alternating fashion). While the mirrored arrangement is shown and described, it should be understood that other embodiments may include asymmetric arrangements with components only facing one side of a printing area.

Figure 2A:
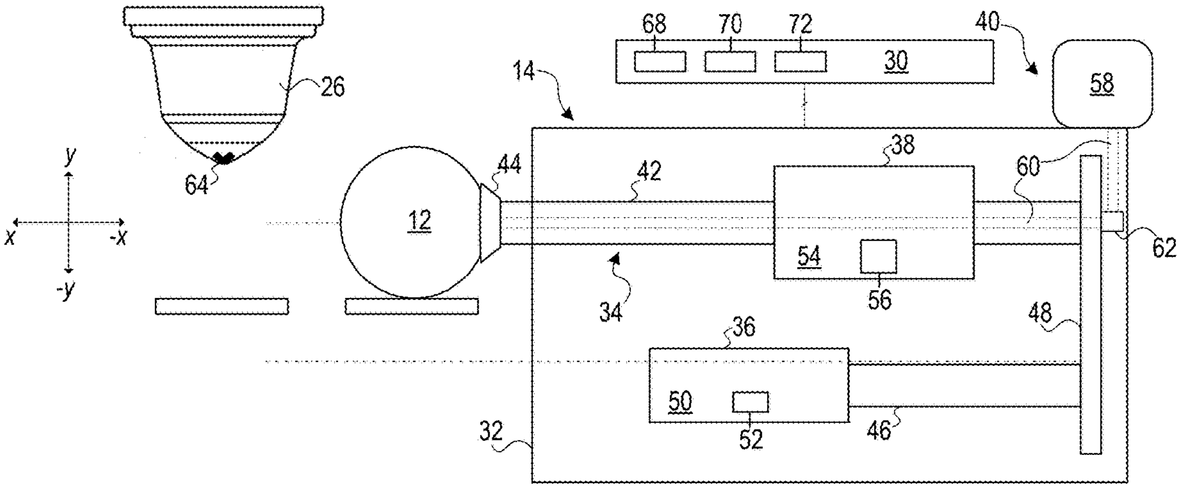
FIG. 2A illustrates a holding device of the golf ball handling system, showing a golf ball in a first translational position.
Figure 2B:
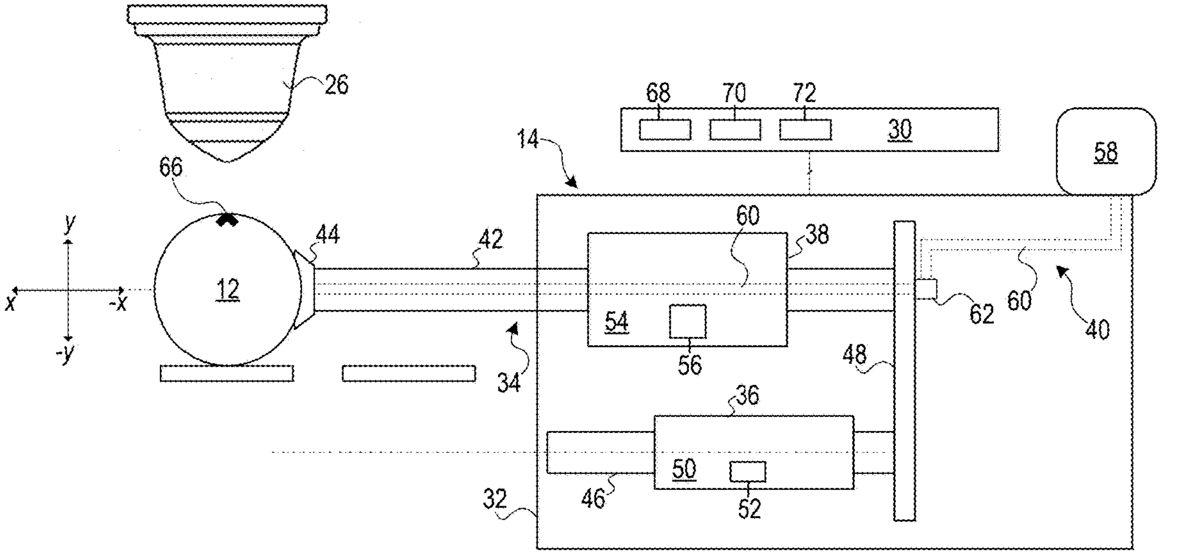
FIG. 2B illustrates the holding device of FIG. 2A, showing the golf ball in a second translational position.
Figure 3A:
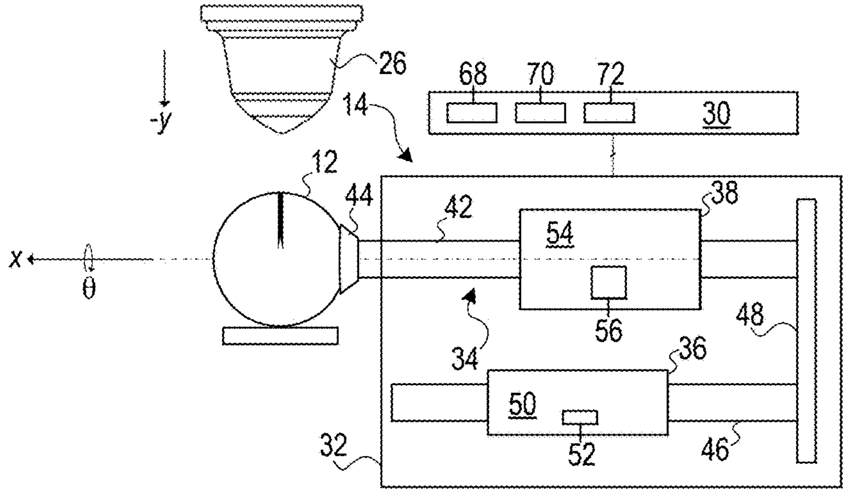
FIG. 3A illustrates a holding device of the golf ball handling system, depicting a golf ball in a first rotational position.
Figure 3B:
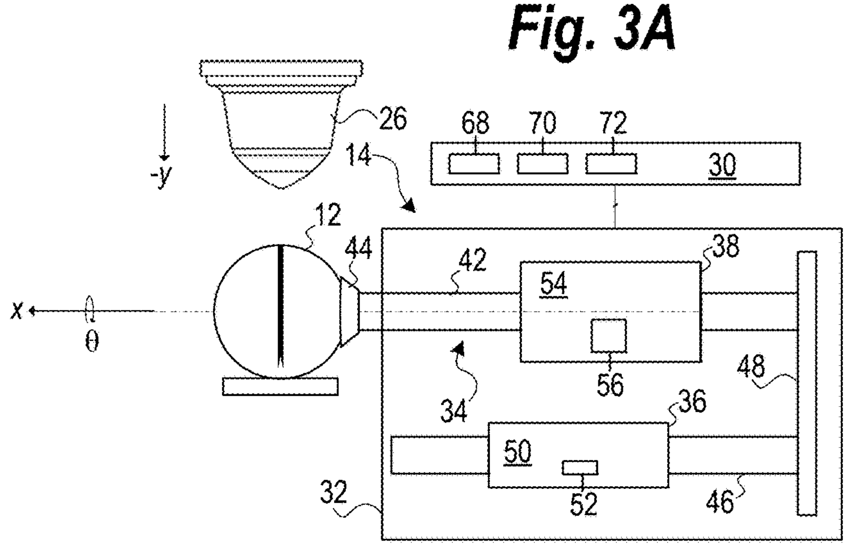
FIG. 3B illustrates the holding device of FIG. 4A, depicting the golf ball in a second rotational position.
Figure 3C:
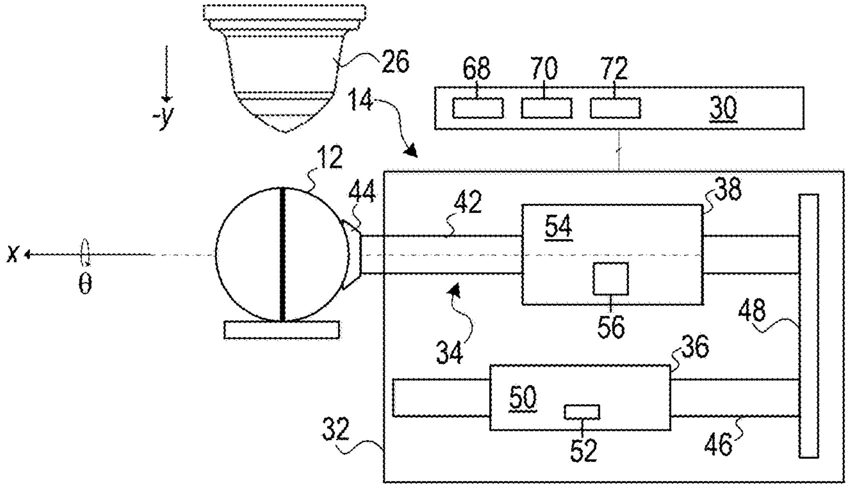
FIG. 3C illustrates the holding device of FIG. 4A, depicting the golf ball in a third rotational position

FIGS. 2A, 2B, and 3A-3C depict a side view of an exemplary holding device 14. The holding device 14 is configured to acquire and move a golf ball 12 based on electronic communication with a control system 30. In an exemplary embodiment, the holding device 14 has a dual-servo configuration to enable motion in at least one translational direction and at least one rotational direction. FIG. 2A shows the holding device 14 in a first translational position and FIG. 2B further shows the holding device 14 in a second translational position, spaced from the second translational position in the x-axis direction. FIGS. 3A-3C, which will be described in more detail below, illustrate exemplary rotational movement by the holding device 14 such that the golf ball 12 is rotated about the x-axis direction.

The holding device 14 may include a housing 32, a support mechanism 34, a first motion device 36, a second motion device 38, and a securing mechanism 40. The housing 32 may include a plurality of connected walls to at least partially enclose the support mechanism 34, the first motion device 36, and the second motion device 38. In this way, the housing 32 may protect interior components from outside elements and assist in providing the holding device 14 with a compact design such that advanced handling functionality can be implemented in a small space.

The support mechanism 34 may include a plurality of interconnected components configured to move relative to a stationary component, such as the housing 32 or another mounting element shown or not shown. The support mechanism 34 includes at least a support member 42 configured to move in the x-axis direction, as shown in FIGS. 2A and 2B. The support member 42 may include a connector 44, such as a cradle or cup, configured to contact and secure the golf ball 12 to the support member 42. At least one of the support member 42 and the connector 44 may be configured to rotate about the x-axis direction to correspondingly rotate the golf ball 12, as shown in FIGS. 3A-3C. The support mechanism 34 may further include a control bar 46 and a support mount 48 rigidly connected to the support member 42.

In an exemplary embodiment, the first motion device 36 is configured to produce translational movement of the support member 42 and connector 44 (and, by extension, the golf ball 12). For example, the first motion device 36 may be directly connected to the control bar 46 and thus indirectly connected to the support member 42 and connector 44 via the support mount 48. The first motion device 36 may include a sleeve 50 configured to receive the control bar 46 and a servo motor 52 configured to control movement of the control bar 46 in the x-axis direction. The control bar 46 may be positioned parallel to the support member 42 such that x-axis direction movement of the control bar 46 causes parallel movement of the support member 42. The servo motor 52 is configured to impart a force onto the control bar 46 in order to cause the control bar 46 to telescope with respect to the sleeve 50. The sleeve 50 may be a fixed component relative to the housing 32. Thus, movement of the control bar 46 relative to the sleeve 50 causes the support member 42 to move relative to the housing 32.

According to an exemplary embodiment, the second motion device 38 is configured to produce rotational movement of the support member and/or connector 44 (and, by extension, the golf ball 12). The second motion device 38 may be directly connected to the support member 42 and/or connector 44 by a rotation support 54. The rotation support 54 may include a servo motor 56 configured to apply a rotational force on the support member 42 and/or the connector 44. For example, the servo motor 56 may be configured to rotate the support member 42 and the connector 44 about the x-axis direction. The support member 42 may be attached to the support mount 48 such that the support member 42 is rotatable relative to the control bar 46, the support mount 48, and the housing 32. In other embodiments, the servo motor 56 may directly rotate the connector 44 relative to the rest of the support mechanism 34.

The securing mechanism 40 may be a component or system configured to enable the support mechanism 34 to couple to a golf ball 12 and hold the golf ball 12 in a particular position and/or orientation. In an exemplary embodiment, the securing mechanism 40 is a device configured to use a suction force to couple the golf ball 12 to the support mechanism 34, and, in particular, to the connector 44. In one example, the securing mechanism 40 includes a vacuum source 58, a vacuum line 60, and a line attachment 62. The vacuum source 58 may be configured to draw a vacuum within the vacuum line 60 to generate a suction force in a direction from the golf ball 12 toward the connector 44. In this way, the golf ball 12 is securely held to the connector 44 for holding, positioning, orienting, rotation, etc. The vacuum line 60 may extend from the vacuum source 58 to the connector 44 through the support member 42. For example, the support member 42 may be a hollow bar configured to enable the vacuum source 58 to produce the suction force at the connector 44. The vacuum line 60 may include additional tubing or similar conduit to complete a fluid circuit between the vacuum source 58 and the connector 44. Some embodiments may include the line attachment 62, such as a clip or bolt, to keep the vacuum line 60 in place and control slack even through translational and/or rotational motion of one or more components of the support mechanism 34.

FIGS. 3A-3C illustrate a sequence of positions of a golf ball 12 connected by the securing mechanism 40 for rotation by the second motion device 38. The golf ball 12 is coupled to the holding device 14 and is turned in a rotational direction θ about the x-axis direction from a first position shown in FIG. 3A, to a second position shown in FIG. 3B, and further to a third position as shown in FIG. 3C. The first, second, and third positions are examples of positions in which the golf ball 12 may be held by the holding device 14 in a process for producing a stamp on a surface of the golf ball 12. For example, a process may be performed to stamp the golf ball 12 at three radially-spaced locations on the golf ball 12 corresponding to the first, second, and third positions. The multiple stamps may be related and/or connected. It should be understood that embodiments may include any number of positions and any number of stamps applied at radially-spaced locations. Further, the spaced locations may overlap to some degree with each other.

FIGS. 2A-2B and FIGS. 3A-C further illustrate an exemplary spatial configuration of the components of the holding device 14, a coupled golf ball 12, and a printing pad 26. As described, the golf ball 12 may be coupled to the connector 44 and move forward and/or backward in the x-axis direction via the first motion device 36. As shown in FIGS. 2A-2B, the first motion device 36 may move the golf ball 12 from a first zone 16 (e.g., a golf ball pickup zone) to a second zone 18, which is a zone aligned under the printing pad 26. The printing pad 26 is positioned off of the x-axis and aligned with the second zone 18 along a y-axis direction. The printing pad 26 may be moved in the y-axis direction into contact with an exposed location on the surface of the golf ball 12 to transfer an ink pattern 64 from the printing pad 26 to the golf ball 12 to produce a marking 66.

Further, as shown in FIGS. 3A-3C, the golf ball 12 may be rotated around the x-axis in the rotational direction θ via the second motion device 38. In this way, multiple locations on the golf ball 12 may be exposed to the printing pad 26 for printing a plurality of markings on the golf ball 12. Because the golf ball 12 can be rotated in a rotational direction θ while otherwise maintaining its alignment with the printing pad 26, the plurality of markings applied to the golf ball 12 are aligned with each other along the rotational direction θ on the surface of the golf ball 12. This feature may be particularly suitable for printing combined markings, such as alignment aids, that should appear to be continuous to an observer but which have a length that requires more than one stamp to be produced. For example, in FIGS. 3A-3C, the printing pad 26 may apply three stamps to three rotationally-spaced locations on the golf ball 12 to produce a continuous line marking 66 that is made up of the three stamps. The continuous line marking 66 may, as a result of the multiple stamps, extend around at least 180° around a centerline of the golf ball 12.

FIGS. 4A-4D depict a marking 100 corresponding to the continuous line marking 66 shown in FIGS. 3A-3C and further illustrating the positioning of the marking 100. The marking 100 may include a first end section 105, a middle section 110, and a second end section 115. As shown in FIGS. 4A-4D, the marking 100 may be designed to extend approximately 180° around a centerline of a golf ball 120.

Figures 4A, 4B, 4C, 4D:
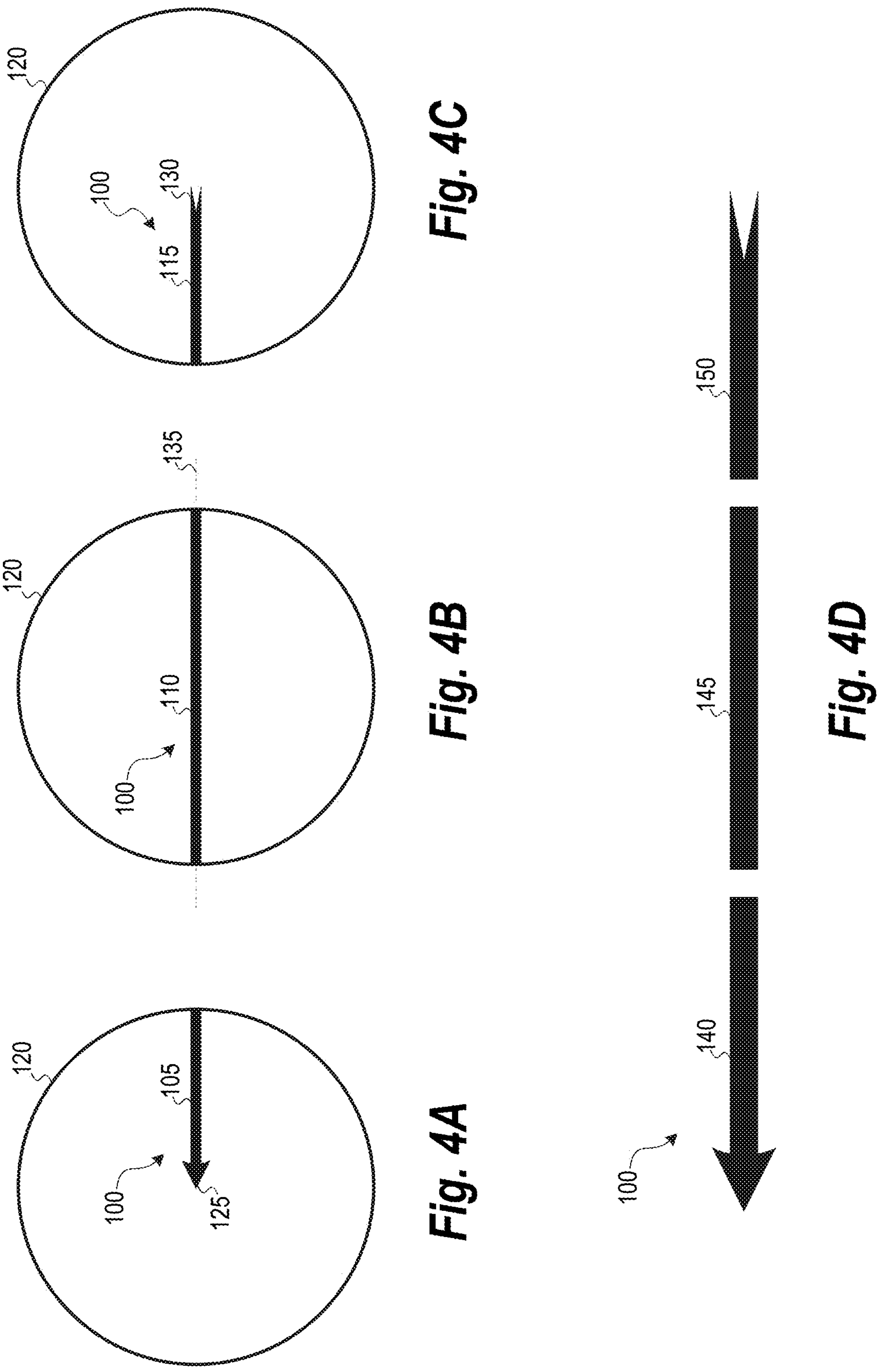
FIGS. 4A-4C depict the finished linear marking of FIG. 3A printed on a golf ball.
FIG. 4D is an exemplary design for a multi-hit marking for a golf ball.

FIG. 4A is a front view of the golf ball 120, FIG. 4B is a side view of the golf ball 120, rotated 90° from the front view, and FIG. 4C is a rear view of the golf ball 120, rotated 90° from the side view. In FIG. 4A, the first end section 105 terminates at a first location 125 of the golf ball 120 and transitions into the middle section 110 to continue around a great circle of the golf ball 120, as shown in FIG. 4B. The middle section 110 transitions into the second end section 115, which terminates at a second location 130 of the golf ball 120. In an exemplary embodiment, the first location 125 and the second location 130 are connected by an axis 135 of the golf ball 120 and thus are located 180° from each other around a great circle of the golf ball 120. However, the first location 125 and the second location 130 may be any two points on the golf ball 120. With the marking 100 extending to opposite sides of the golf ball 120, it cannot be printed onto the golf ball 120 as a single stamp. Instead, multiple stamps applied at different sites on the golf ball 120 are necessary to create the marking 100.

FIG. 4D illustrates three separate single markings 140, 145, 150, respectively, that can be applied to the golf ball 120 to create the linear marking 100. The marking 140 is a first end section stamp, the marking 145 is a middle section stamp, and the marking 150 is a second end section stamp. When combined, the single markings 140, 145, 150 appear as the combined marking 100 shown in FIGS. 4A-4C. The markings 140, 145, 150 may be applied to the golf ball 120 separately using a pad printing process at three locations on the golf ball 120, as positioned by the golf ball handling system 10. The single stamps of the markings 140, 145, 150 may overlap as printed on the golf ball 120. In some embodiments, the same printing pad 26 may apply each of the markings 140, 145, and 150 with the golf ball 120 being rotated by the holding device 14. In another embodiment, three different printing pads 26 may apply each of the markings 140, 145, and 150. For example, the golf ball 120 and/or holding device 14 may move in a z-direction (shown in FIG. 1) to align with different printing pads 26, in combination with rotation of the golf ball 120 via the holding device 14 to align an appropriate portion of the golf ball 120 for printing.

In order to accomplish a selected task, such as a printing task, the holding device 14 is connected to the control system 30. The control system 30 may include a plurality of electronic components providing instructions to controllable components of the holding device 14. For example, the control system 30 may include at least one processor 68, at least one memory 70, and at least one I/O device 72. The memory 70 may store instructions to be executed by the processor 68 in order to cause the golf ball handling system 10 and/or holding device 14 to perform a task related to one or more golf balls. For example, the control system 30 may execute a control process to receive, position, orient, and hold a golf ball 12 for pad printing.

Figure 5:
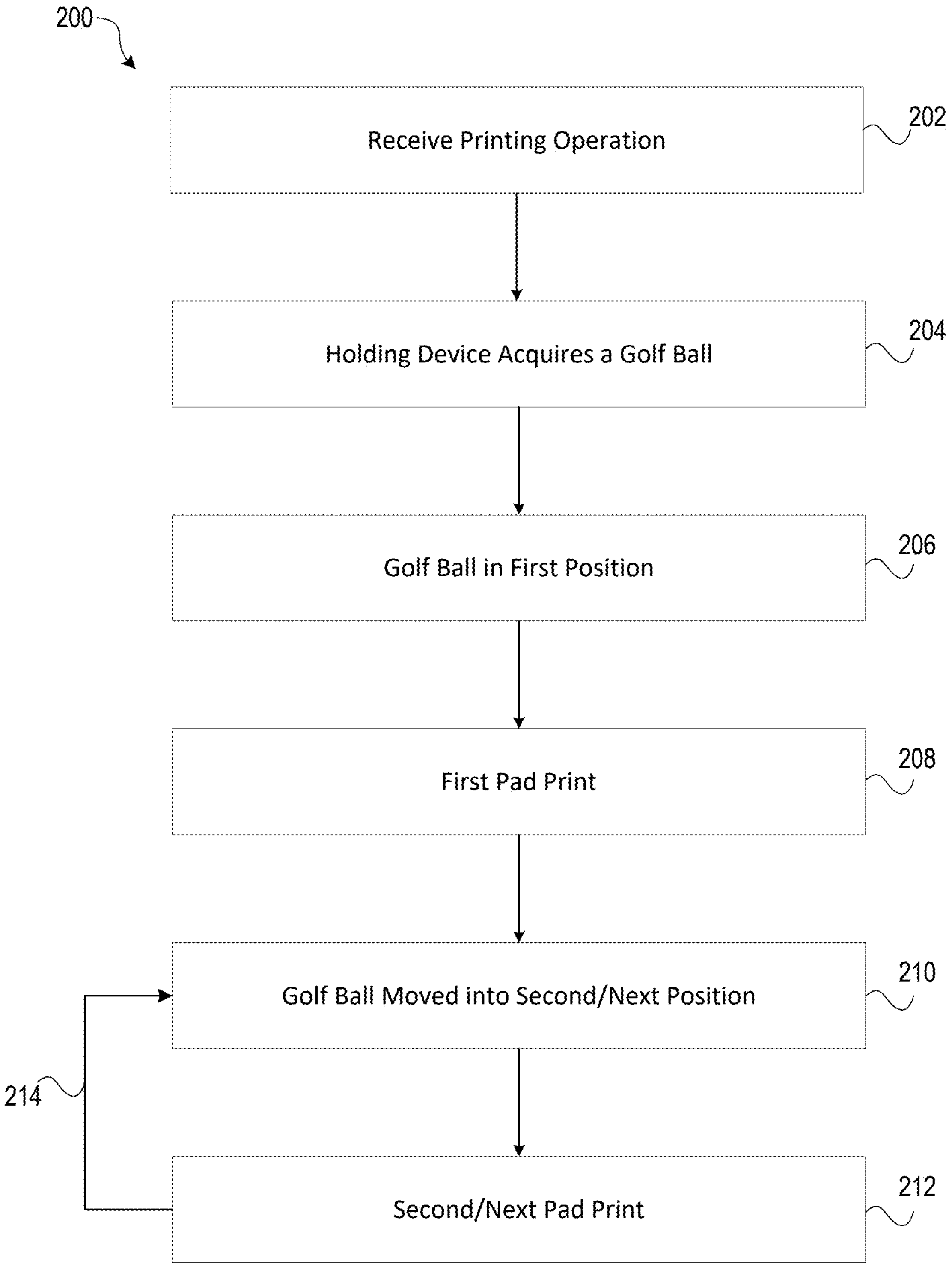
FIG. 5 is a flowchart of an exemplary golf ball handling method, consistent with disclosed embodiments.

FIG. 5 is a flowchart of an exemplary process 200 for multi-hit printing on a golf ball. The control system 30 may perform one or more steps of the process 200 in order to cause one or more components of the golf ball handling system 10 to perform an action related to printing on the golf ball. For example the processor 68 may execute instructions stored by the memory 70 to perform one or more of the steps of the process 200. The processor 68 may use input from and/or produce output for the one or more I/O devices 72 in performing the process 200.

In step 202, the control system 30 may receive a printing operation. The printing operation may include specifications for printing multiple markings on the surface of a golf ball. For example, the printing operation may include instructions for printing three markings on three spaced locations on the golf ball using a holding device as described herein.

In step 204 the holding device may acquire the golf ball on which printing will be performed. The golf ball or the connector may be moved such that the connector 44 contacts the golf ball. In one example, the control system 30 may move the support mechanism 34 to couple the connector 44 to a golf ball. For instance, the first motion device 36 may move the support member 42 in a translational direction to cause the connector 44 to contact the golf ball. In other examples, the golf ball may be moved or placed into contact with a stationary connector 44. The golf ball may be coupled to the connector with a retaining force by way of the securing mechanism 40. For example, the vacuum source 58 may apply a suction force to retain the golf ball in contact with the connector 44.

In step 206, the control system 30 may move the golf ball, which is coupled to the support mechanism 34, to a first position. As used herein, a first, second, etc. "position" may include one or both of a location in space (e.g., x, y, z, coordinates) and a rotational orientation at that location (e.g., rotational position based on θ or multi-dimensional coordinates to identify the exact orientation of the golf ball). For instance, the control system 30 may instruct at least one of the first motion device 36 or the second motion device 38 to manipulate the components of the support mechanism 34 to position the golf ball along the x-axis and/or orient the golf ball in the rotational direction θ. In some embodiments, the first position may be relative to markings already present on the golf ball, such as a logo, play number, side stamp, etc.

In an exemplary embodiment, the first position is associated with a first site of the golf ball that is exposed to a printing pad 26 when the golf ball is in the first position. In step 208, a first pad print operation is performed to create a first marking on a surface of the golf ball at the first site. In some embodiments, the control system 30 may be operably connected to the printing pad 26 to control movement of the printing pad 26 (e.g., in the y-axis direction) to stamp the first site or it may be a separate and/or manual process.

In step 210, the golf ball is moved into a second position. For example, the control system 30 may provide instructions to cause the support mechanism 34 to move the golf ball 12 such that a second site on the surface of the golf ball is exposed for printing. Step 210 may include, for example, the second motion device rotating the golf ball to a second rotational orientation in the θ direction. Alternatively, or in addition, the first motion device 36 (or other component of the golf ball handling system 10) may move the golf ball in a translational direction to the second position. For example, the golf ball may move to a new printing station or printing pad for printing of a new color, different stamp, etc. In step 212, a second printing operation is performed to create a second marking on the surface of the golf ball at the second site. The second printing operation may involve the same printing pad 26 used in the first printing operation, or may be a different printing pad. The control system 30 may control the printing pad or it may be a separate and/or manual process.

In step 214, steps 210 and step 212 are optionally repeated as needed to complete stamps that include more than two printing operation steps. For example, step 210 may be repeated to cause the support mechanism 34 to move the golf ball to a next (e.g., third, fourth, fifth, etc.) position and step 212 may be repeated to pad print the next (e.g., third, fourth, fifth, etc.) stamp onto a next site on the golf ball. The golf ball may include a multi-hit stamp printing on the golf ball surface as a result of the process 200.

In one example, the process 200 may be performed to print the marking 100 on a golf ball. For instance, the process 200 may be performed by the control system 30 instructing the support mechanism 34 to arrange the golf ball 12 in a first position. A first printing operation is performed to print the first end section 105 of the marking 100 on a first site on the surface of the golf ball. Then, the control system 30 may instruct the support mechanism 34 to rotate the golf ball in the θ direction to place the golf ball in a second position and expose a second site on the surface of the golf ball to a printing pad. A second printing operation may then be performed to print the middle section 110 of the marking 100 at the second site. These steps may be repeated again to rotate the golf ball further in the θ direction to place the golf ball in a third position and then printing the second end section 115 of the marking 100 at a third site on the surface of the golf ball. The control system 30 and support mechanism 34 may be precisely and accurately controlled to align the first, second, and third sites on the surface of the golf ball with the printing pad(s) such that the resulting marking 100 appears continuous as one stamp, even though it is made of multiple stamps. The continuous stamp may be used as an alignment aid for a golf using the golf ball.

Figure 6A:
FIG. 6A illustrates an example of a single stamp that may be repeatedly printed to produce a continuous multi-hit stamp, consistent with disclosed embodiments.
Figure 6B:
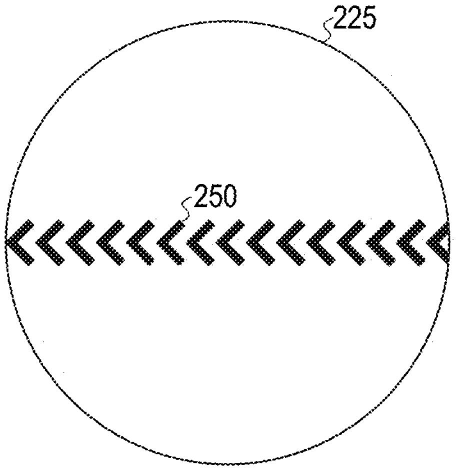
FIG. 6B illustrates a first side of a golf ball having a continuous multi-hit stamp resulted from repeated printing of the single stamp of FIG. 6A, consistent with disclosed embodiments.
Figure 6C:
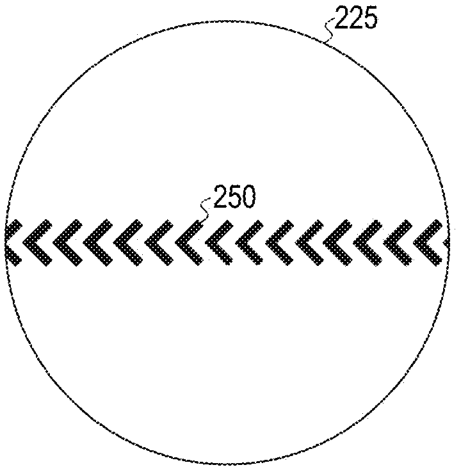
FIG. 6C illustrates a second side of a golf ball having a continuous multi-hit stamp resulted from repeated printing of the single stamp of FIG. 6A, consistent with disclosed embodiments

The marking 100 is an example of a multi-hit stamp that includes single stamps that are different from each other. FIGS. 6A-6C depict another example of a single marking that may be printed multiple times using the process 200 to produce a multi-hit stamp having a continuous appearance. FIG. 6A illustrates a single marking 220 that may be repeatedly printed at different radial positions around a golf ball 225 to produce a continuous appearance of a combined marking 250 on the golf ball 225. In the depicted example, the marking 220 includes a plurality of spaced arrows that align to point in a single direction. This marking 220 may be printed around an equator of the golf ball 225 to produce a continuous multi-hit stamp that may be used as an alignment aid for a golfer.

In some embodiments, such as the exemplary processes for producing the markings 100, 220, a printing process may involve only rotating a golf ball a certain number of degrees around a single axis (e.g., around the x-axis in the θ direction) to expose different sites/locations on the surface of the golf ball for each printing operation. These processes are convenient for being performed with only a single holding device 14 with sequential rotations of the golf ball in a single direction θ. Further embodiments of a holding device consistent with the disclosure include additional components for more complex rotations of a golf ball to expose subsequent sites on the surface of the golf ball that do not necessarily align along a single rotational direction of the golf ball. In other words, additional embodiments may include features to enable rotation about more than one axis and/or degree of freedom.

Figure 7:
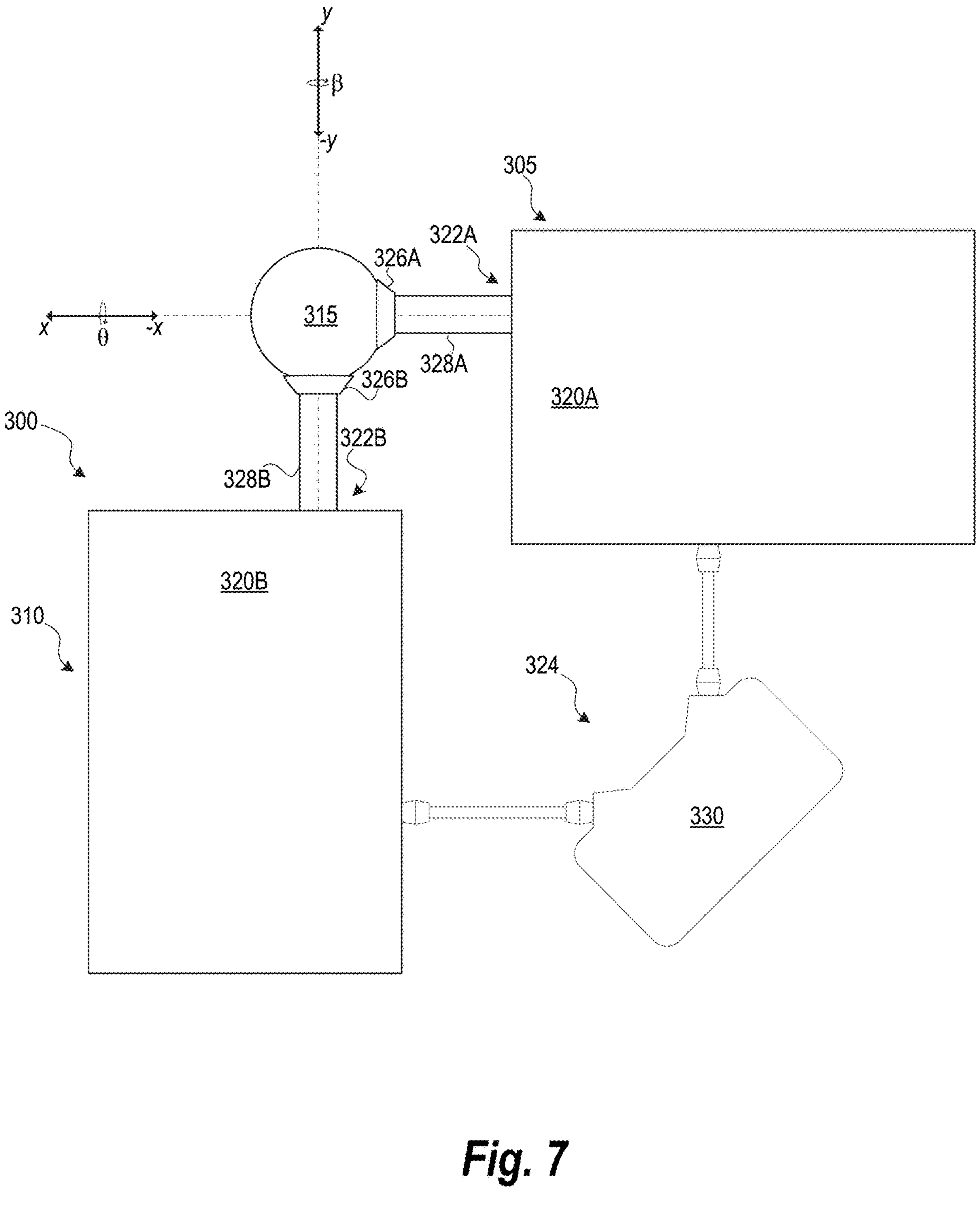
FIG. 7 illustrates a combined holding device, according to a disclosed embodiment.

FIG. 7 is an example of a multi-axis holder 300, consistent with disclosed embodiments. The multi-axis holder 300 may include a first holding device 305 and a second holding device 310. In an exemplary embodiment, the first holding device 305 and the second holding device 310 are each the same as or substantially similar to the holding devices 14 previously described. Each of the holding devices 305, 310 may be arranged to simultaneously contact a golf ball 315. One or more of the holding devices 305, 310 may apply a retaining force to hold the golf ball 315 in place.

Each holding device 305, 310 may include all of the features of the holding device 14 described above. For example, each holding device 305, 310 may include a housing 320A, 320B, a support mechanism 322A, 322B, and a securing mechanism 324. Each housing 320A may enclose components (not shown) including but limited to a first motion device, second motion device, control bar, support mount, sleeve, servo motors, and rotation support in order to enable connectors 326A, 326B of the support mechanisms 322A, 322B to move in translational and rotational directions. The holding devices 305, 310 may be arranged such that the support member 328A is positioned on the x-axis and support member 328B is positioned on the y-axis, perpendicular to the support member 328A. In this way, the connector 326A may be moved translationally in the x-axis direction and rotationally around the x-axis in the θ direction. In addition, the connector 326B may be moved translationally in the y-axis direction and rotationally around the y-axis in the β direction.

The securing mechanism 324 may be the same as or similar to the securing mechanism 40. For example, the securing mechanism 324 may produce a retaining force at one or more of the connectors 326A, 326B to hold and retain the golf ball 315 in the position shown. The retaining force may be, for example, a suction force as a result of air pressure. In some embodiments, the securing mechanism 324 includes a combined vacuum source 330 that is connected to both of the holding devices 305, 310 to produce a suction force at each of the connectors 326A, 326B. The vacuum source 330 may be separately controllable for each of the holding devices 305, 310. In other embodiments, each holding device 305, 310 may include its own vacuum source.

The multi-axis holder 300 may be similar to the single holding device arrangement shown in FIGS. 2A-2B and 3A-3C in that a golf ball is held to a support mechanism by a retaining force and is movable to multiple different positions. The multi-axis holder 300 further includes the capability of moving the golf ball in multiple translational directions and rotating around multiple axes. As a result, the multi-axis holder 300 enables complex rotation and positioning of the golf ball to expose any site on the surface of the golf ball for printing, such as by the control system 30 (or another similar control system).

In one example, the control system 30 may instruct the first holding device 305 to acquire the golf ball 315 at a position on the x-axis and move the golf ball in the x-axis direction to the position shown in FIG. 7. Prior to a first or subsequent printing operation with the golf ball in this position, the first holding device 305 may rotate the golf ball 315 in the rotational direction θ around the x-axis and/or the second holding device 310 may rotate the golf ball 315 in the rotational direction β around the y-axis. In this way, the control system 30 may be configured to position the golf ball 315 such that any portion of the surface of the golf ball may be aligned and exposed to a printing pad for subsequent printing. The control system 30 may use a known positioning of the golf ball 315 to determine the amount of rotation necessary for moving from a first position to a second position (e.g., number of degrees in the θ direction and number of degrees in the β direction). Rotation about each axis may occur simultaneously or sequentially.

Figure 8A:
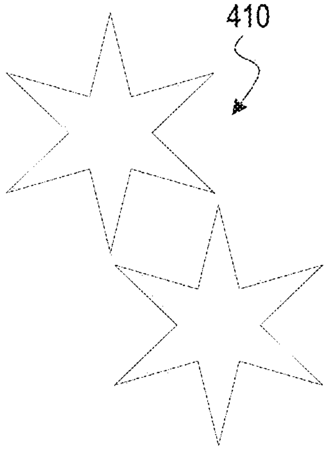
FIG. 8A illustrates another example of a single stamp that may be combined into a multi-hit stamp, consistent with disclosed embodiments.
Figure 8B:
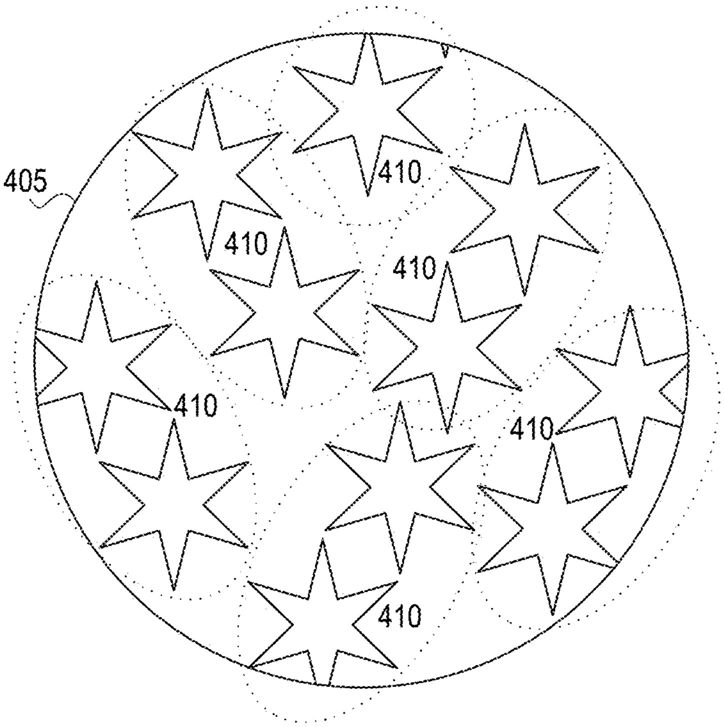
FIG. 8B illustrates a golf ball having a multi-hit stamp produced by repeated printing of the single stamp of FIG. 8A, consistent with disclosed embodiments.

FIGS. 8A and 8B depict an example of single marking that may be printed multiple times to produce a multi-hit stamp on a golf ball 405. FIG. 8A illustrates a single marking 410 that may be repeatedly printed at different positions around the entire surface of the golf ball 405. The multi-axis holder 300 may be used to print the marking 410 at multiple sites on the golf ball 405, where at least two of the spaced markings 410 are spaced from each other in both the 0 and B direction. In this way, a multi-hit pattern, such as the star pattern shown, may be repeated around an entire or large portion of a surface of a golf ball to create unique printed effects.

Figure 9:
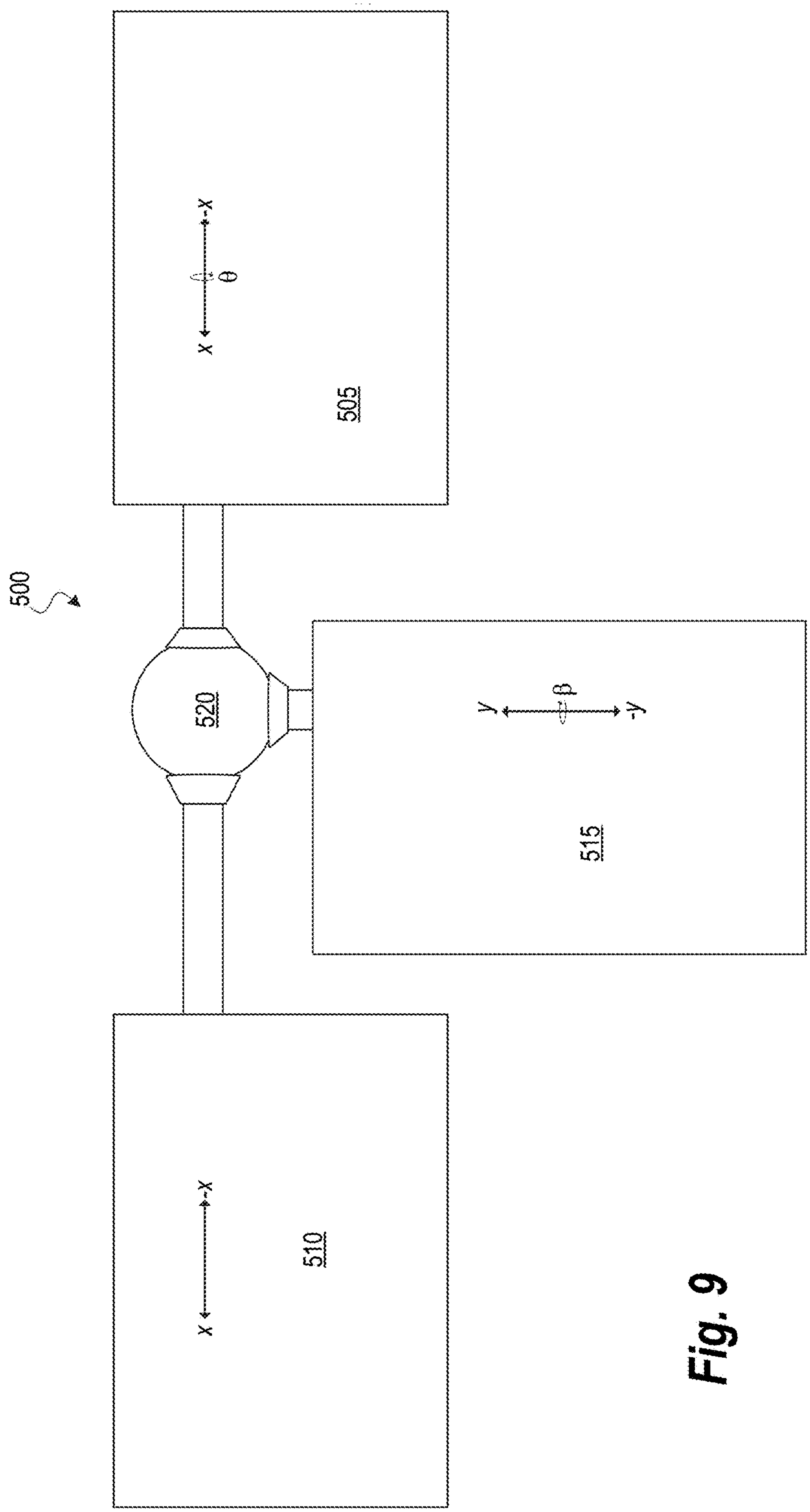
FIG. 9 illustrates another combined holding device, according to another disclosed embodiment.

The disclosed embodiments describe holding devices that both acquire and retain a golf ball for printing. In some embodiments, the retaining force may be a suction force applied by a vacuum source. However, other configurations are possible. FIG. 9 depicts another embodiment of a multi-axis holder 500, including three holding devices 505, 510, and 515 for holding and positioning a golf ball 520. Each holding device 505, 510, 515 may be the same or similar to the holding device 14 descried above.

The first holding device 505 and the second holding device 510 may be opposed from each other to compress or pinch the golf ball 520 in able to retain the golf ball 520 along the x-axis. In this way, a compression force may be a retaining force for holding the golf ball 520. One or more of the first holding device 505 or second holding device 510 may be configured to rotate the golf ball 520 around the x-axis in the θ direction. The third holding device 515 may position the golf ball 520 along the y-axis and may also be arranged to rotate the golf ball around the y-axis in the β direction.

The multi-axis holders 300, 500 or other similar embodiments may perform the process 200 or a similar process for multi-hit printing on the surface of a golf ball. The process may include steps 206, 210, 214 to position the golf ball for printing. In these steps, the control system 30 may provide movement instructions for rotating in one or both of the θ and β directions to expose different sites on the surface of the golf ball to a printing pad. The stamps may be the same or different between sequential printing operations.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

The invention claimed is:

1. A holding device for handling a golf ball, the holding device comprising:

- a support mechanism configured to contact and hold the golf ball, the support mechanism comprising a support member, a control bar, and a support mount rigidly connected between the support member and the control bar;
- a first motion device configured to move the golf ball and at least a portion of the support mechanism in a translational direction along an axis, wherein the first motion device comprises a sleeve and a first servo motor configured to move the control bar through the sleeve to cause translational movement of the support member via the support mount along the axis;
- a second motion device configured to move the golf ball and at least a portion of the support mechanism in a rotational direction around the axis; and
- a securing mechanism configured to produce a retaining force configured to hold the golf ball to the support mechanism.

2. The holding device of claim 1, further comprising a housing enclosing the first motion device, the second motion device, and at least a portion of the support mechanism.

3. The holding device of claim 1, wherein the support mechanism further comprises a connector connected to the support member and configured to contact the golf ball.

4. The holding device of claim 1, wherein the second motion device comprises a second servo motor configured to rotate the support member around the axis.

5. The holding device of claim 3, wherein the securing mechanism comprises a vacuum source and a vacuum line, wherein the vacuum source is configured to produce a suction force at the connector through the vacuum line.

6. The holding device of claim 5, wherein the support member is a hollow bar configured to enable the vacuum source to produce the suction force at the connector.

7. A multi-axis holder for handling a golf ball, comprising:

- a first holding device, comprising:
  - a first support mechanism configured to contact and hold the golf ball;
  - a first device configured to move the golf ball and at least a portion of the first support mechanism in at least one of a translational direction along a first axis or a rotational direction around the first axis, wherein the first device comprises a first motion device configured to move the golf ball and at least a portion of the first support mechanism in the translational direction along the first axis, and a second motion device configured to move the golf ball and at least a portion of the first support mechanism in the rotational direction around the first axis;
  - a first securing mechanism configured to produce a retaining force configured to hold the golf ball to the first support mechanism;
- a second holding device, comprising:
  - a second support mechanism configured to contact and hold the golf ball; and
  - a second device configured to move the golf ball and at least a portion of the second support mechanism in at least one of a translational direction along a second axis or a rotational direction around the second axis, wherein the second device comprises a third motion device configured to move the golf ball and at least a portion of the second support mechanism in the translational direction along the second axis, and a fourth motion device configured to move the golf ball and at least a portion of the second support mechanism in the rotational direction around the second axis.

8. The holder of claim 7, wherein the first axis is perpendicular to the second axis.

9. The holder of claim 7, wherein the second holding device further comprises a second securing mechanism configured to produce a retaining force configured to hold the golf ball to the second support mechanism.

10. The holder of claim 7, wherein the first support mechanism and the second support mechanism are configured to contact the golf ball simultaneously.

* * * * *